(12) United States Patent
Compton et al.

(10) Patent No.: US 11,769,134 B2
(45) Date of Patent: Sep. 26, 2023

(54) MULTI-USER INTERACTIVE AD SHOPPING USING WEARABLE DEVICE GESTURES

(71) Applicant: International Business Machines Corporation, Armonk, NY (US)

(72) Inventors: Christian Compton, Austin, TX (US); Trisha Elaine Hanlon, Round Rock, TX (US); Michael Bender, Rye Brook, NY (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 17/207,962

(22) Filed: Mar. 22, 2021

(65) Prior Publication Data
US 2022/0300941 A1 Sep. 22, 2022

(51) Int. Cl.
*G06Q 30/00* (2023.01)
*G06Q 20/32* (2012.01)
(Continued)

(52) U.S. Cl.
CPC ........... *G06Q 20/321* (2020.05); *G06F 3/017* (2013.01); *G06Q 20/40145* (2013.01);
(Continued)

(58) Field of Classification Search
None
See application file for complete search history.

(56) References Cited

U.S. PATENT DOCUMENTS 8,976,965 B2 * 3/2015 Aminzade ....... H04M 1/724094
380/258
9,131,333 B2 * 9/2015 Gai .......................... G06F 3/017
(Continued)

FOREIGN PATENT DOCUMENTS

AU  2011220382 A1 * 10/2012 ........... G02B 27/017
CN  105574744 A      5/2016
(Continued)

OTHER PUBLICATIONS

Andrea Bianchi et al. "Wearable authentication: Trends and Opportunities." (Jun. 3, 2016). Retrieved online Mar. 21, 2023. https://www.researchgate.net/publication/305076814_Wearable_authentication_Trends_and_opportunities (Year: 2016).*
(Continued)

*Primary Examiner* — James A Reagan
(74) *Attorney, Agent, or Firm* — Stephanie L. Carusillo (57) ABSTRACT

In an approach for enabling multiple users to make e-commerce purchases from interactive advertisements using wearable device gestures, a processor identifies a wearable device attempting to pair with a smart display. A processor verifies a user wearing the wearable device is an authenticated user. A processor detects a gesture made by the user based on a sensor of the wearable device. A processor identifies an action the gesture is mapped to. A processor determines whether the user is authorized to complete the action mapped to the gesture detected. Responsive to determining that the user is authorized to complete the action mapped to the gesture, a processor completes the action the gesture is mapped to.

17 Claims, 4 Drawing Sheets

(51) Int. Cl.
*G06Q 20/40* (2012.01)
*G06Q 30/0601* (2023.01)
*G06F 3/01* (2006.01)
*G06Q 30/02* (2023.01)
*H04L 9/40* (2022.01)
*H04W 12/00* (2021.01)
*G06Q 30/0251* (2023.01)

(52) U.S. Cl.
CPC ..... *G06Q 30/0253* (2013.01); *G06Q 30/0281* (2013.01); *G06Q 30/0623* (2013.01); *G06Q 30/0633* (2013.01); *H04L 63/08* (2013.01); *H04W 12/00* (2013.01)

(56) References Cited

U.S. PATENT DOCUMENTS

| | | | | |
|---|---|---|---|---|
| 9,569,163 | B2 * | 2/2017 | Gai | H04W 4/21 |
| 9,736,291 | B2 * | 8/2017 | Gai | H04W 12/50 |
| 9,910,632 | B1 * | 3/2018 | Morgan | G09G 5/12 |
| 10,284,551 | B2 * | 5/2019 | Sarin | G06V 40/1365 |
| 10,319,022 | B2 * | 6/2019 | Clayton | G06Q 30/0631 |
| 10,346,122 | B1 * | 7/2019 | Morgan | G06F 3/0484 |
| 10,831,161 | B2 * | 11/2020 | Wang | G06Q 30/327 |
| 10,896,447 | B1 * | 1/2021 | Cohen | G06F 3/0488 |
| 10,922,733 | B2 * | 2/2021 | Oh | G06Q 30/0623 |
| 11,579,766 | B2 * | 2/2023 | Cohen | G06F 3/04886 |
| 2007/0055635 | A1 | 3/2007 | Kanapur | |
| 2007/0239546 | A1 | 10/2007 | Blum | |
| 2013/0169526 | A1 * | 7/2013 | Gai | G06F 3/03547 345/156 |
| 2014/0244429 | A1 * | 8/2014 | Clayton | G06Q 30/0631 705/26.7 |
| 2014/0244488 | A1 * | 8/2014 | Kim | H04L 1/1614 705/39 |
| 2015/0067536 | A1 * | 3/2015 | Leorin | H04W 12/06 715/753 |
| 2016/0054973 | A1 * | 2/2016 | Gai | H04W 12/50 345/173 |
| 2016/0065301 | A1 * | 3/2016 | Kukulski | H04W 4/80 455/41.2 |
| 2016/0070439 | A1 | 3/2016 | Bostick | |
| 2016/0162259 | A1 * | 6/2016 | Zhao | G06F 3/167 715/728 |
| 2016/0173492 | A1 * | 6/2016 | Han | G06Q 20/322 705/16 |
| 2016/0316506 | A1 * | 10/2016 | Ur | H04W 4/80 |
| 2016/0342220 | A1 * | 11/2016 | Kim | G06F 3/005 |
| 2017/0038847 | A1 * | 2/2017 | Schorsch | G06F 1/163 |
| 2017/0177291 | A1 * | 6/2017 | Gai | H04W 12/04 |
| 2017/0225690 | A1 | 8/2017 | Elnajjar | |
| 2018/0041859 | A1 * | 2/2018 | Forster | G06Q 20/321 |
| 2018/0067562 | A1 | 3/2018 | Saitou | |
| 2018/0067713 | A1 * | 3/2018 | Morgan | G06F 3/04883 |
| 2019/0052747 | A1 * | 2/2019 | Breaux | H04W 4/48 |
| 2019/0156405 | A1 * | 5/2019 | Nickerson | G06Q 30/0633 |
| 2019/0287083 | A1 * | 9/2019 | Wurmfeld | G06Q 20/321 |
| 2020/0226612 | A1 * | 7/2020 | Tunnell | G06Q 20/4016 |
| 2020/0342076 | A1 * | 10/2020 | Alameh | G06F 21/35 |
| 2021/0082004 | A1 * | 3/2021 | Cohen | G06F 3/04842 |
| 2021/0133844 | A1 * | 5/2021 | Oh | G06F 3/017 |
| 2021/0304559 | A1 * | 9/2021 | Cupersmith | G06N 20/00 |
| 2022/0253823 | A1 * | 8/2022 | Gupta | G06F 1/163 |
| 2022/0335476 | A1 * | 10/2022 | Abdel-Wahab | G06Q 30/0261 |
| 2022/0383260 | A1 * | 12/2022 | Palamadai | H04M 1/72454 |

FOREIGN PATENT DOCUMENTS

| | | | | |
|---|---|---|---|---|
| CN | 106101755 | A | 11/2016 | |
| CN | 106598211 | A | 4/2017 | |
| CN | 108417009 | A | 8/2018 | |
| CN | 110061755 | A | 7/2019 | |
| CN | 112154402 | A | 12/2020 | |
| DE | 112016003719 | T5 * | 5/2018 | A61B 3/113 |
| GB | 2515550 | A | 8/2013 | |
| JP | 2003187127 | A | 7/2003 | |
| KR | 20130116618 | A | 10/2013 | |
| KR | 20140108494 | A | 9/2014 | |
| KR | 20190088545 | A * | 7/2019 | G06F 3/0304 |
| TW | 201342282 | A | 10/2013 | |
| WO | 2014107623 | A1 | 7/2014 | |
| WO | 2015112108 | A1 | 7/2015 | |

OTHER PUBLICATIONS

Reyhan Duezguen et al. "Towards Secure and Usable Authentication for Augmented and Virtual Reality Head-Mounted Displays." (Jul. 24, 2020). Retrieved online Mar. 21, 2023. https://arxiv.org/pdf/2007.11663.pdf (Year: 2020).*

Ben Dickson. "How Augmented Reality is Transforming Work." (Oct. 16, 2017). Retrieved online Mar. 21, 2023. https://www.pcmag.com/news/how-augmented-reality-is-transforming-work (Year: 2017).*

Badju et al., "Shopping Using Gesture Driven Interaction", Lund University, Master's Thesis in Department of Design Sciences, May 2015, 105 Pages.

"Patent Cooperation Treaty PCT International Search Report", Applicant's File Reference: IEE220107PCT, International Application No. PCT/CN2022/075618, International Filing Date: Feb. 9, 2022, dated Apr. 26, 2022, 9 pages.

* cited by examiner

MULTI-USER INTERACTIVE AD SHOPPING USING WEARABLE DEVICE GESTURES

BACKGROUND OF THE INVENTION

The present invention relates generally to the field of wearable devices, and more particularly to enabling multiple users to make e-commerce purchases from interactive advertisements using wearable device gestures.

Interactive advertising is anything that encourages the target audience to interact with advertising, marketing, or promotions. It turns traditional advertising into an activity that encourages the audience to do something, rather than view the ad passively. There are many ways businesses create interactive advertising, such as: augmented reality, virtual reality, quizzes, responding to questions, and QR codes.

Interactive advertising is a great way for marketers to really engage with consumers directly. Interactive marketing as a whole and interactive ads are a great way for brands to tell stories, enhance word of mouth, and get personal in ways that they just haven't been able to do before.

SUMMARY

Aspects of an embodiment of the present invention disclose a method, computer program product, and computer system enabling multiple users to make e-commerce purchases from interactive advertisements using wearable device gestures. A processor identifies a wearable device attempting to pair with a smart display. A processor verifies a user wearing the wearable device is an authenticated user. A processor detects a gesture made by the user based on a sensor of the wearable device. A processor identifies an action the gesture is mapped to. A processor determines whether the user is authorized to complete the action mapped to the gesture detected. Responsive to determining that the user is authorized to complete the action mapped to the gesture, a processor completes the action the gesture is mapped to.

In some aspects of an embodiment of the present invention, a processor identifies the wearable device attempting to pair with the smart display upon the wearable device coming within a pre-set distance of the smart display.

In some aspects of an embodiment of the present invention, a processor verifies the user wearing the wearable device is the authenticated user based on biometrics of the user.

In some aspects of an embodiment of the present invention, a processor identifies a time when the gesture is performed by the user.

In some aspects of an embodiment of the present invention, a processor identifies the action the gesture is mapped to by comparing the gesture with a set of gestures overlaid in an interactive advertisement displayed on the smart display at the time the gesture is performed by the user.

In some aspects of an embodiment of the present invention, the action is selected from the group consisting of purchasing a product, wanting more information about the product, and placing the product in a shopping cart associated with the user.

In some aspects of an embodiment of the present invention, a processor determines whether the user is authorized to complete the action mapped to the gesture detected by reviewing interactive ad preferences and product purchasing authorizations stored in a user profile associated with the user.

DETAILED DESCRIPTION

Embodiments of the present invention recognize the growing use of interactive advertisements (hereinafter "ad" or "ads", as appropriate) by businesses. Thus, embodiments of the present invention provide a system and method that enable multiple users to individually make e-commerce purchases at the same time from interactive ads on the same smart display using wearable device gestures. The multiple users' wearable devices pair with a smart display rendering an interactive ad or video. Embodiments of the present invention ensure each individual user is properly authenticated and identify a level of authorization a given user has to make a purchase from an ad or interact with an ad and/or video. Embodiments of the present invention establish different wearable device gestures for different interactions with a product in an ad, overlay an image of each gesture with a respective product in the ad on the smart display device, and recognize when at least one of a plurality of users perform at least one of the wearable device gestures. A gesture, as used herein, refers to a movement of part of a body of a user wearing a wearable device, especially a hand or wrist of the user to express or signal the user's intention to interact with a product shown in an interactive ad. Embodiments of the present invention provide the benefit of enabling multiple viewers of an interactive ad or video to purchase one or more products by simply completing one or more gestures displayed in the interactive ad that are mapped to the one or more respective products.

In one use case, embodiments of the present invention provide a system and method for multiple users each with a wearable device in a movie theater to interact with ads and/or a movie being displayed on a smart movie screen. Embodiments of the present invention overlay a specific gesture for each product displayed in the interactive ad/video on the movie screen, in which the overlaid gesture is positioned near the associated product. The gesture is mapped to the associated product and can initiate a purchase of the product or some other sort of interaction with the product (e.g., more information on the product such as cost, product specifications, and/or product nutrition). For example, the interactive ad may be for different concessions available at a concession stand of the movie theater. On the movie screen, gesture A may be overlayed on the screen near a soda, gesture B may be overlayed on the screen near a large popcorn, and gesture C may be overlayed on the screen near a candy bar. Users that have opted-in to the system can perform any of the gestures shown on the movie screen during the ad and/or video to purchase and/or interact with the products mapped to the gestures performed.

Embodiments of the present invention enable participating users (i.e., users that have opted-in to the system) to pair and/or authenticate their respective wearable devices with a smart display system, so that the smart display system can recognize specific users and monitor for gestures made indicating respective users want to interact with (e.g., purchase a product, get more information about a product, etc.) an ad being shown on the smart display. Embodiments of the present invention will be trained to identify and authenticate a user with the wearable device via biometrics or gestures. While displaying one or more ads on the smart display, embodiments of the present invention depict what types of gestures are to be performed for each displayed product, so that users know what gesture to do to interact with a specific product displayed.

Embodiments of the present invention authenticate each user to identify if an authorized user is wearing an associated wearable device, which has opted-in to an interactive ad and gesture program of the smart display system, that is attempting to pair with the smart display system. Once an authorized user is identified, embodiments of the present invention can look up user information in a stored user profile, in which the user information can include delivery address and payment information. Users can perform one or more of the specified gestures while the ad is displayed on the smart display. Based on the performed gestures by one or more users, embodiments of the present invention recognize associated products and a type of interaction (i.e., purchasing a product, adding a product to shopping cart, adding a product to wish-list). Embodiments of the present invention can track multiple inputs from one or more wearable devices based on performed gestures and identity information.

For example, Bob opts-in to the system with his smartwatch upon entering the movie theater. While Bob is viewing the opening ads for a movie, Bob decides to buy a large popcorn after seeing an ad for products available at the concession stand. Bob performs the hand gesture shown on the movie screen that is overlayed near the image of a large popcorn. After performing the hand gesture, the system completes Bob's purchase order for the large popcorn and enables delivery of the large popcorn to Bob. At the same time as Bob, Sam, who has also opted-in to the system with her smartwatch, performs the hand gesture shown on the movie screen that is overlayed near an image of a large soda. The system completes Sam's purchase order and enables delivery of the large soda to Sam.

Implementation of embodiments of the invention may take a variety of forms, and exemplary implementation details are discussed subsequently with reference to the Figures.

Figure 1:
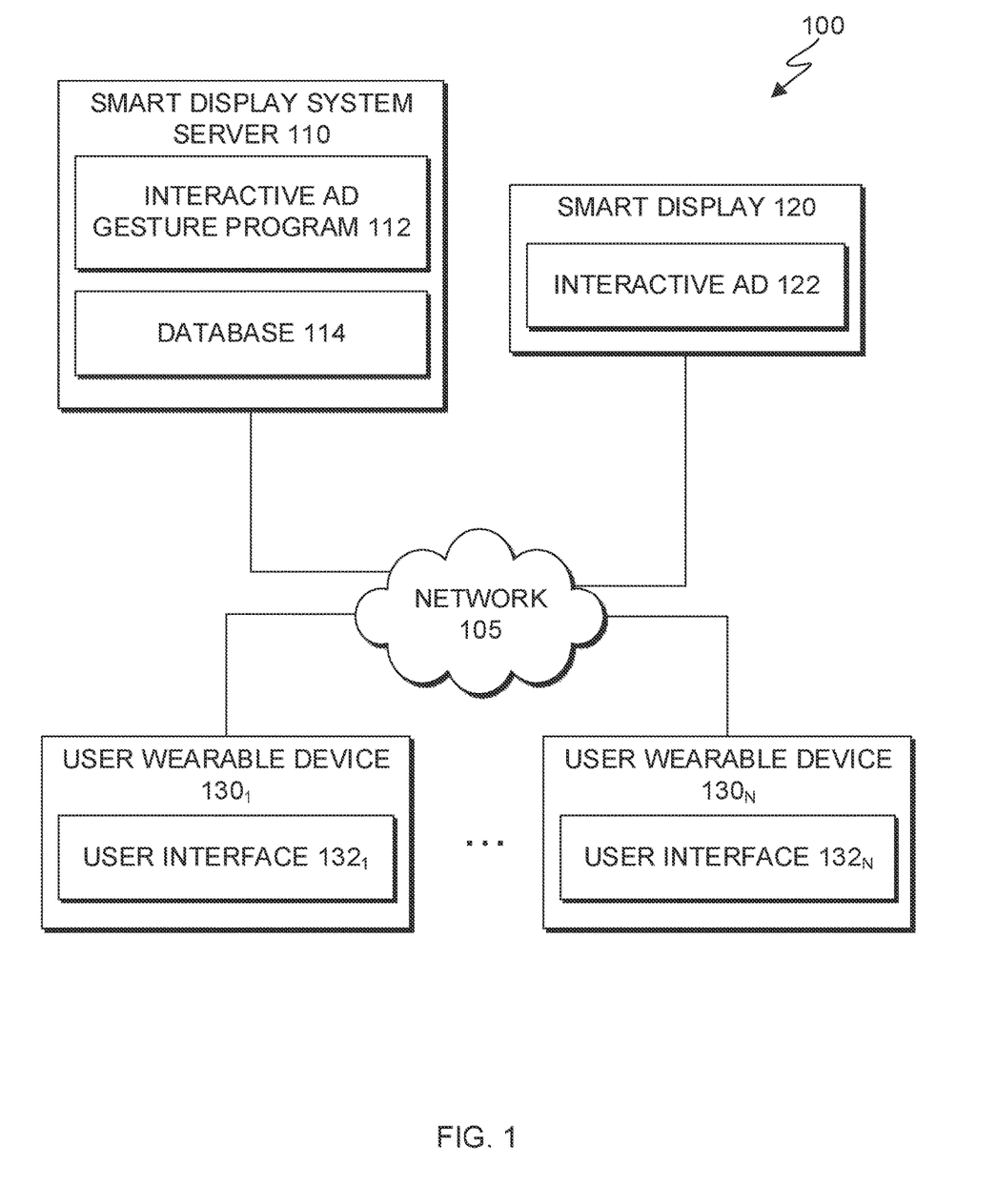
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. In an embodiment, distributed data processing environment 100 represents a smart display interactive ad system that enables and manages multiple users making e-commerce purchases from interactive advertisements using wearable device gestures. The term "distributed," as used herein, describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes smart display system server 110, smart display 120, and user wearable devices $130_{1-N}$ interconnected over network 105. Network 105 can be, for example, a telecommunications network, a local area network (LAN), a wide area network (WAN), such as the Internet, or a combination of the three, and can include wired, wireless, or fiber optic connections. Network 105 can include one or more wired and/or wireless networks capable of receiving and transmitting data, voice, and/or video signals, including multimedia signals that include voice, data, and video information. In general, network 105 can be any combination of connections and protocols that will support communications between smart display system server 110, smart display 120, user wearable devices $130_{1-N}$, and other computing devices (not shown) within distributed data processing environment 100.

Smart display system server 110 can be a standalone computing device, a management server, a web server, a mobile computing device, or any other electronic device or computing system capable of receiving, sending, and processing data. In other embodiments, smart display system server 110 can represent a server computing system utilizing multiple computers as a server system, such as in a cloud computing environment. In another embodiment, smart display system server 110 can be a laptop computer, a tablet computer, a netbook computer, a personal computer (PC), a desktop computer, a personal digital assistant (PDA), a smart phone, or any programmable electronic device capable of communicating with smart display 120, user wearable devices $130_{1-N}$, and other computing devices (not shown) within distributed data processing environment 100 via network 105. In another embodiment, smart display system server 110 represents a computing system utilizing clustered computers and components (e.g., database server computers, application server computers, etc.) that act as a single pool of seamless resources when accessed within distributed data processing environment 100. smart display system server 110 includes interactive ad gesture program 112 and database 114. smart display system server 110 may include internal and external hardware components, as depicted and described in further detail with respect to FIG. 4.

Interactive ad gesture program 112 operates to enable multiple users to make e-commerce purchases from and/or interact with interactive advertisements using wearable device gestures. In the depicted embodiment, interactive ad gesture program 112 is a standalone program. In another embodiment, interactive ad gesture program 112 may be integrated into another software product, such as a product marketing engine. In an embodiment, users, i.e., ad viewers and potential purchasers, opt-in to the use of interactive ad gesture program 112 and set up a user profile with interactive ad gesture program 112. The setup component of interactive ad gesture program 112 is depicted and described in further detail with respect to FIG. 2. The main function of interactive ad gesture program 112, enabling multiple users to make e-commerce purchases from and/or interact with interactive advertisements using wearable device gestures, is depicted and described in further detail with respect to FIG. 3.

Database 114 operates as a repository for data received, used, and/or output by interactive ad gesture program 112.

Data received, used, and/or generated may include, but is not limited to, a plurality of user profiles with user profile information input by a user during setup about their interactive ad preferences, product purchasing authorizations, payment information, and delivery address information; and any other data received, used, and/or output by interactive ad gesture program 112. Database 114 can be implemented with any type of storage device capable of storing data and configuration files that can be accessed and utilized by server 110, such as a hard disk drive, a database server, or a flash memory. In an embodiment, database 114 is accessed by interactive ad gesture program 112 to store and/or to access the data. In the depicted embodiment, database 114 resides on smart display system server 110. In another embodiment, database 114 may reside on another computing device, server, cloud server, or spread across multiple devices elsewhere (not shown) within distributed data processing environment 100, provided that interactive ad gesture program 112 has access to database 114.

The present invention may contain various accessible data sources, such as database 114, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. Interactive ad gesture program 112 enables the authorized and secure processing of personal data.

Interactive ad gesture program 112 provides informed consent, with notice of the collection of personal and/or confidential company data, allowing the user to opt in or opt out of processing personal and/or confidential company data. Consent can take several forms. Opt-in consent can impose on the user to take an affirmative action before personal and/or confidential company data is processed. Alternatively, opt-out consent can impose on the user to take an affirmative action to prevent the processing of personal and/or confidential company data before personal and/or confidential company data is processed. Interactive ad gesture program 112 provides information regarding personal and/or confidential company data and the nature (e.g., type, scope, purpose, duration, etc.) of the processing. Interactive ad gesture program 112 provides the user with copies of stored personal and/or confidential company data. Interactive ad gesture program 112 allows the correction or completion of incorrect or incomplete personal and/or confidential company data. Interactive ad gesture program 112 allows for the immediate deletion of personal and/or confidential company data.

Smart display 120 operates as a smart display device, such as a digital screen (e.g., TV, movie screen), of the smart display system that is connected to a network (e.g., network 105) via a wireless or wired protocol. In the depicted embodiment, smart display 120 displays/outputs interactive ads, e.g., interactive ad 122, that nearby users can interact with. Interactive ad 122 represents any type of advertisement that nearby users can interact with in some way, e.g., purchase a product shown in the ad or request more information about a product in the ad. For example, smart display 120 may be a movie theater screen displaying interactive ad 122 that is depicting several products that can be purchased from a concessions stand at the movie theater. In several embodiments, interactive ad 122 of smart display 120 is what users who have opted-in to smart display system via interactive ad gesture program 112 are interacting with, e.g., attempting to purchase a product depicted in interactive ad 122. In the depicted embodiment, smart display 120 is the only smart display shown, but in other embodiments, distributed data processing environment 100 may include any number of smart displays depicting interactive ads.

User wearable devices $130_{1-N}$ (hereinafter "user wearable devices 130"), in which "N" can represent any positive integer, each operate as a wearable computing device (e.g., smart watch, smart glasses, virtual reality headsets, smart clothing, etc.) associated with a user, in which the user can interact with an interactive ad and/or purchase a product from an interactive ad simply by making the mapped gesture using their wearable device. User wearable devices 130 must include movement tracking sensors that can detect when a user makes a variety of gesture while wearing a respective wearable device. It is to be understood that user wearable devices 130 are representative of users that have opted-in to smart display system via interactive ad gesture program 112 and distributed data processing environment 100 may include any number of user wearable devices that have opted-in. In the depicted embodiment, each of user wearable devices 130 includes an instance of a user interface. User wearable devices 130 may include internal and external hardware components, as depicted and described in further detail with respect to FIG. 4.

User interfaces $132_{1-N}$ (hereinafter "user interfaces 132"), in "N" can represent any positive integer, each provides an interface between interactive ad gesture program 112 on server 110 and users of user wearable devices 130, respectively. In one embodiment, user interfaces 122 and 132 are mobile application software. Mobile application software, or an "app," is a computer program designed to run on smart phones, tablet computers and other mobile devices. In one embodiment, user interfaces 132 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interfaces 132 enable users of user wearable devices 130 to create a user account for smart display system via interactive ad gesture program 112, in which the user can input payment information, delivery address information, interactive ad preferences, product purchasing authorizations. Further, user interfaces 132 enable users of user wearable devices 130 to opt-in or opt-out of interactive ad gesture program 112.

Figure 2:
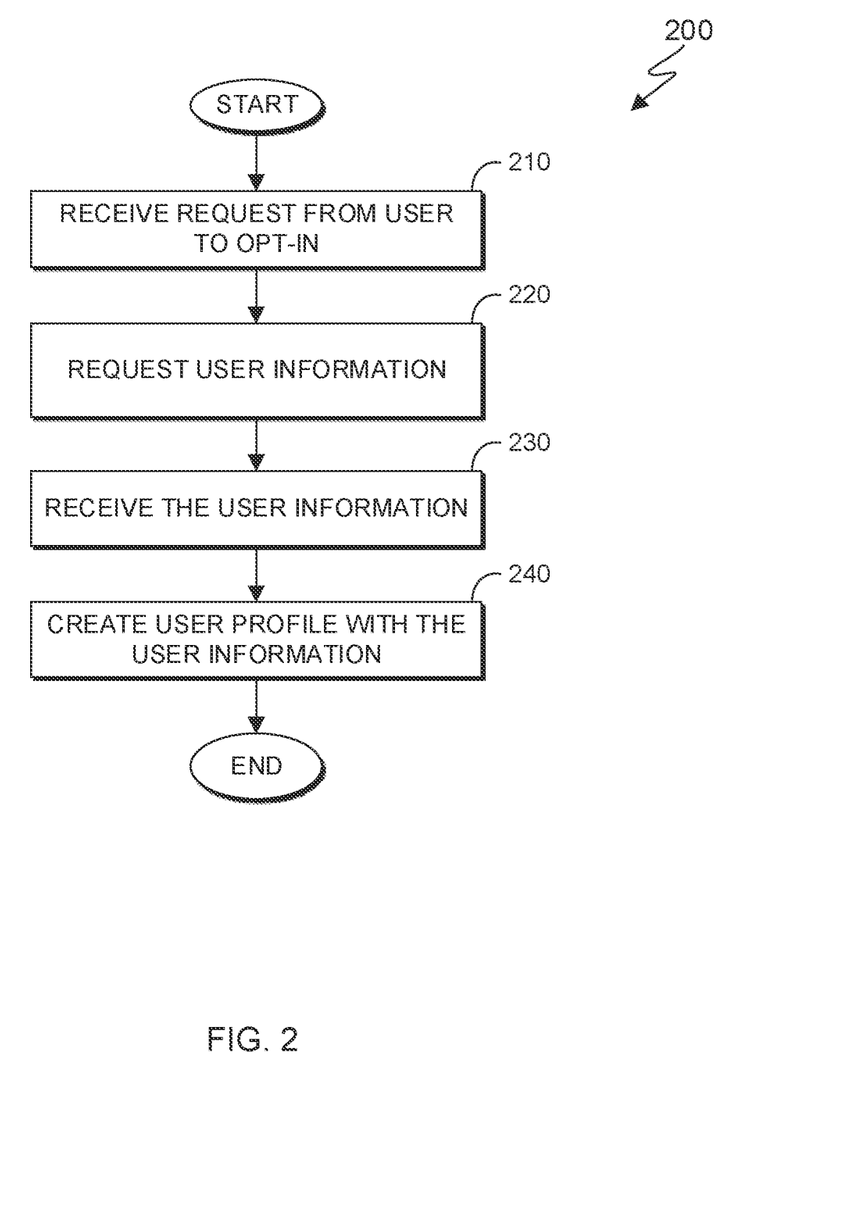
FIG. 2 is a flowchart depicting operational steps of a setup component of an interactive ad gesture program, in accordance with an embodiment of the present invention.

FIG. 2 is a flowchart 200 depicting operational steps of a setup component of interactive ad gesture program 112, on smart display system server 110 within distributed data processing environment 100 of FIG. 1, in accordance with an embodiment of the present invention. In an embodiment, interactive ad gesture program 112 completes a one-time setup with a user to create a user profile with interactive ad gesture program 112 for the user that is looking to interact with interactive ads through smart device gestures. The one-time setup allows interactive ad gesture program 112 to opt-in enabling users to interact and make purchases from interactive ads. It should be appreciated that the process depicted in FIG. 2 illustrates one possible iteration of interactive ad gesture program 112, which may be repeated for each opt-in request received by interactive ad gesture program 112.

In step 210, interactive ad gesture program 112 receives a request from a user to opt-in. In an embodiment, interactive ad gesture program 112 receives a request from a user through a computing device (e.g., smart wearable device) to opt-into interactive ad gesture program 112. For example, a user of user wearable device 130₁ sends a request to opt-in to interactive ad gesture program 112 through user interface 132₁ of user wearable device 130₁.

In step 220, interactive ad gesture program 112 requests user information from the user. In an embodiment, interactive ad gesture program 112 requests user information from the user including, but not limited to, interactive ad preferences, product purchasing authorizations, payment information, and delivery address/location information. In an embodiment, responsive to interactive ad gesture program 112 receiving the request from the user to opt-in, interactive ad gesture program 112 requests user information from the user.

Interactive ad preferences may include the user's preferences on which types of interactive ads to pair with and which types of interactive ads the user can interact with. Product purchasing authorizations may include what types of products the user can purchase, how many products the user can purchase at a certain time, and what type of ads the user can purchase products from. Payment information may include credit card information or any other type of e-payment method the user can input information for to enable a verified purchase to occur. Delivery address information may include an address or location where the user wants a purchased product delivered. A location where the user wants a purchased product delivered may be determined based on the user's real-time location based on a real-time location of the user's wearable device. A real-time location can be determined by any means known in the art, e.g., GPS location of the user's wearable device.

In step 230, interactive ad gesture program 112 receives requested user information. In an embodiment, interactive ad gesture program 112 receives requested user information from the user. In an embodiment, responsive to interactive ad gesture program 112 requesting user information from the user, interactive ad gesture program 112 receives the user information from the user.

In step 240, interactive ad gesture program 112 creates a user profile based on the user information. In an embodiment, interactive ad gesture program 112 creates a user profile for the user and includes the user information received from the user. In an embodiment, interactive ad gesture program 112 stores the user profile and/or the user information in a database, e.g., database 114. In an embodiment, responsive to interactive ad gesture program 112 receiving the user information from the user, interactive ad gesture program 112 creates the user profile based on the user information.

Figure 3:
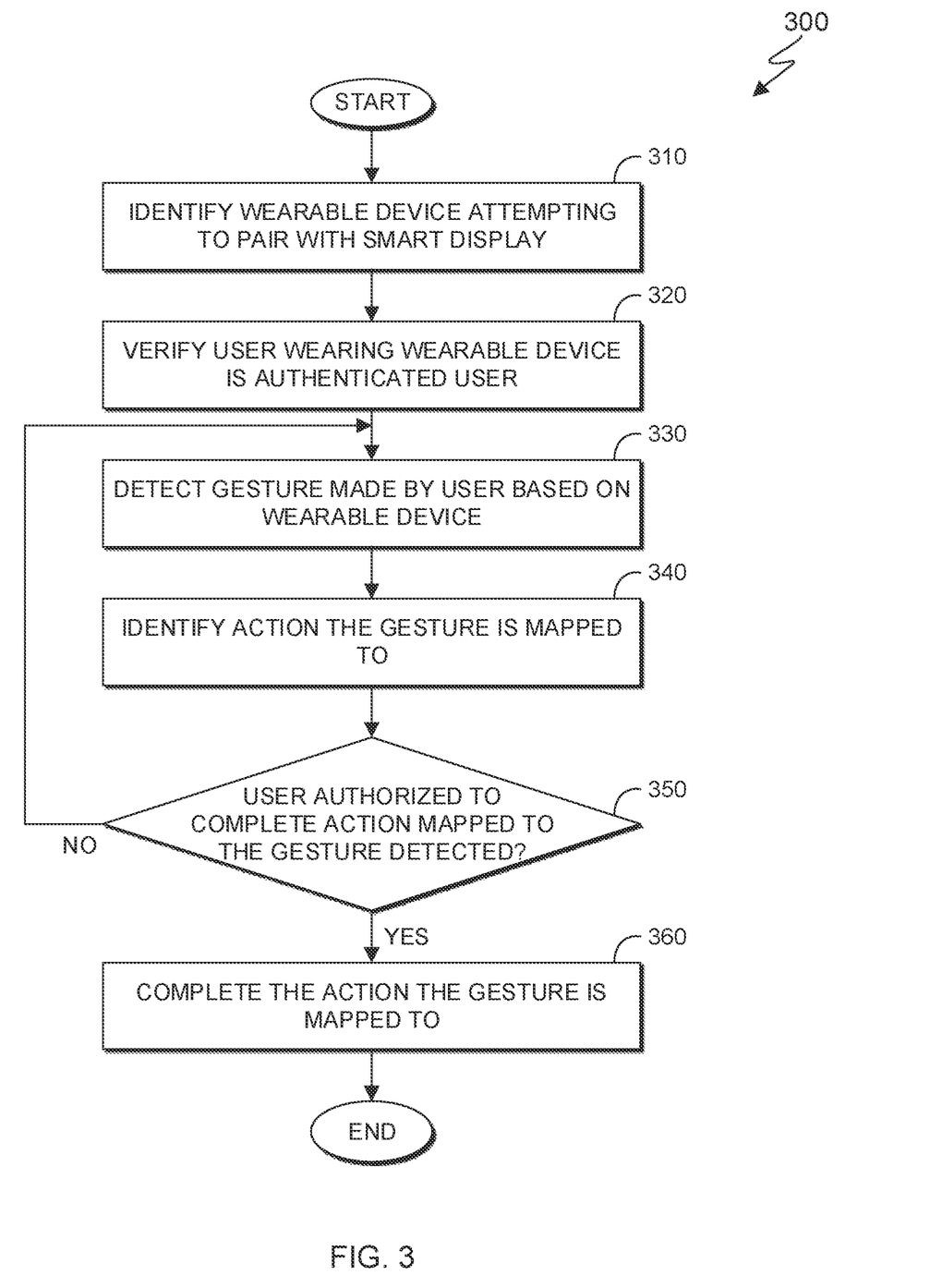
FIG. 3 is a flowchart depicting operational steps of the interactive ad gesture program, which enables multiple users to make e-commerce purchases from interactive advertisements using wearable device gestures, in accordance with an embodiment of the present invention.

FIG. 3 is a flowchart 300 depicting operational steps of interactive ad gesture program 112, for enabling a user to make one or more e-commerce purchases from interactive advertisements using wearable device gestures, in accordance with an embodiment of the present invention. It should be appreciated that the process depicted in FIG. 3 illustrates one possible iteration of interactive ad gesture program 112, which initiates for each wearable device that attempts to pair with a smart display.

In step 310, interactive ad gesture program 112 identifies a wearable device attempting to pair with a smart display. In an embodiment, interactive ad gesture program 112 identifies a wearable device attempting to pair with a smart display when the wearable device comes within a pre-set distance of the smart display. In this embodiment, a wearable device that is registered with interactive ad gesture program 112 to automatically pair with a smart display of smart display system when the wearable device comes within a pre-set distance of the smart display. In another embodiment, interactive ad gesture program 112 identifies a wearable device attempting to pair with a smart display when a user of the wearable device enables pairing with the smart display via a user interface. For example, once user A takes their seat in a movie theater, user A enables, through a user interface of user A's smart watch, pairing with the smart movie screen.

In step 320, interactive ad gesture program 112 verifies a user wearing the wearable device is an authenticated user. In an embodiment, interactive ad gesture program 112 verifies the user wearing the wearable device is an authenticated and authorized user. In an embodiment, responsive to identifying a wearable device attempting to pair with a smart display, interactive ad gesture program 112 verifies a user wearing the wearable device is an authenticated user. In an embodiment, interactive ad gesture program 112 verifies the user using biometrics as known to a person of skill in the art, e.g., fingerprint recognition, or through input of a password, pin code, etc. In an embodiment, interactive ad gesture program 112 verifies the user using gestures. For example, interactive ad gesture program 112 verifies the user based on the user performing a gesture stored in the user profile that the user has pre-set during the set up/opt-in process as the gesture to perform proving that the user is an authenticated user linked to the wearable device and is authorized to interact with the smart display.

In step 330, interactive ad gesture program 112 detects a gesture made by the user based on a sensor of the wearable device. In an embodiment, interactive ad gesture program 112 detects a gesture made by the user based on a movement tracking sensor of the wearable device and/or video inputs from any type of Internet of Things (IoT) related sensors as known to a person of skill in the art, e.g., forward facing cameras on mobile devices, smart watches, and any other smart devices that have video/camera inputs. In an embodiment, interactive ad gesture program 112 matches the gesture detected to a master knowledge corpus for gestures to ensure the gesture is verified. In an embodiment, interactive ad gesture program 112 identifies a time when the gesture is made by the user, so that interactive ad gesture program 112 can compare with gestures overlaid near associated products in the interactive ad displayed on the smart display at that time.

In step 340, interactive ad gesture program 112 identifies an action the gesture is mapped to. In an embodiment, interactive ad gesture program 112 identifies an action and product the gesture is mapped to. In an embodiment, responsive to detecting the gesture made by the user based on the sensor of the wearable device, interactive ad gesture program 112 identifies an action the gesture is mapped to. In an embodiment, interactive ad gesture program 112 identifies the action and the product user intends to interact with by comparing the gesture detected to gestures overlaid on the smart display at the same time the gesture was performed. In some embodiments, one product may have multiple gestures denoting different actions that can be taken for that product based on which gesture the user performs. An action is the way the user wants to interact with the product, i.e., purchase the product, receive more information about the product, etc. For example, interactive ad gesture program 112 identifies that user A performs gesture X mapped to purchasing a large popcorn.

In some embodiments, interactive ad gesture program 112 detects a gesture made by the user based on a sensor of the wearable device but cannot match the gesture to any mapped actions of the smart display. In these embodiments, interactive ad gesture program 112 requests clarification from the user as to what gesture they were making or what product they were attempting to interact with. Interactive ad gesture program 112 may output this request as a push notification on the user's wearable device or an associated computing device of the user, e.g., the user's mobile device. Interactive ad gesture program 112 may output an alert to the wearable device that the gesture made by the user could not matched with any mapped actions of the smart display. In these embodiments, interactive ad gesture program 112 enables the user to attempt to make a gesture again to interact with the product the user initially intended to.

In decision 350, interactive ad gesture program 112 determines whether the user is authorized to complete the action mapped to the gesture detected. In an embodiment, responsive to identifying the action the gesture is mapped to, interactive ad gesture program 112 determines whether the user is authorized to complete the action mapped to the gesture detected. In an embodiment, interactive ad gesture program 112 determines whether the user is authorized to complete the action mapped to the gesture detected by reviewing a user profile of the user. In an embodiment, interactive ad gesture program 112 reviews interactive ad preferences and product purchasing authorizations stored in the user profile to determine whether the user is authorized to complete the action mapped to the gesture detected. For example, responsive to identifying that user A performed gesture X mapped to purchasing a large frozen ice drink, interactive ad gesture program 112 reviews the user profile for user A to see if user A is authorized to purchase a large frozen ice drink.

If interactive ad gesture program 112 determines the user is not authorized to complete the action mapped to the gesture detected (decision 350, NO branch), interactive ad gesture program 112 does not proceed and returns to before step 330 to wait for another gesture to be detected. If interactive ad gesture program 112 determines the user is authorized to complete the action mapped to the gesture detected (decision 350, YES branch), interactive ad gesture program 112 proceeds to step 360.

In step 360, interactive ad gesture program 112 completes the action the gesture is mapped to. In an embodiment, interactive ad gesture program 112 completes the action the gesture is mapped to, e.g., completes the purchase of the product, sends information about the product to the user, or puts the product in a shopping cart of the user. In an embodiment, responsive to determining the user is authorized to complete the action mapped to the gesture detected, interactive ad gesture program 112 completes the action the gesture is mapped to. In an embodiment in which the action involved purchasing a product, interactive ad gesture program 112 completes the purchase using payment information and delivery information stored in the user profile of the user.

It is to be understood that FIG. 3 represents one wearable device pairing with a smart display of the smart display system and an authorized user of that wearable device performing one or more gestures mapped to one or more products displayed in an interactive ad or video on the smart display enabling the authorized user to interact with the one or more products in some way, but the smart display system can manage multiple wearable devices pairing with multiple smart displays and respective authorized users performing multiple gestures mapped to multiple products enabling the multiple users to interact with the multiple products in some way.

Figure 4:
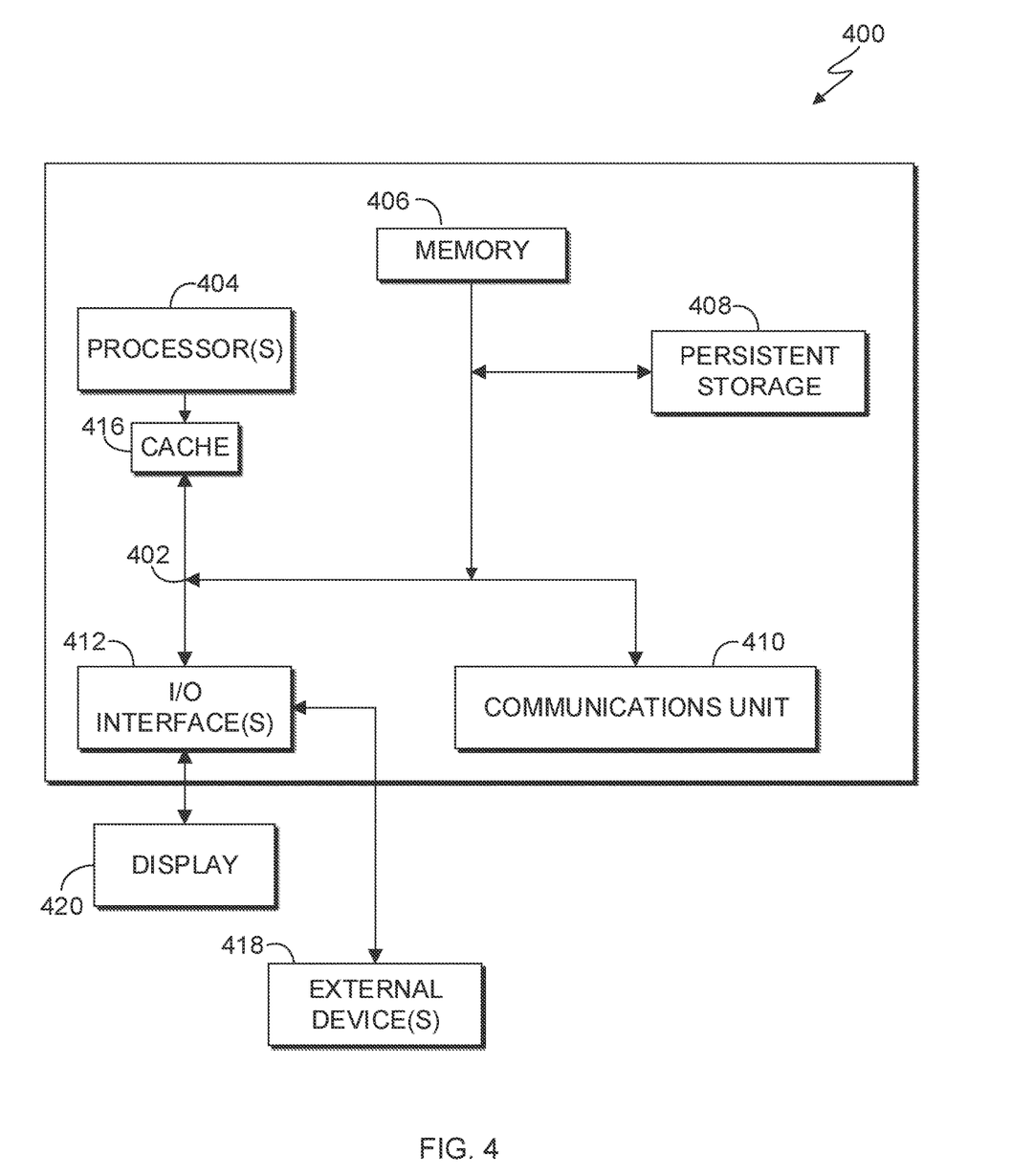
FIG. 4 depicts a block diagram of components of a computing device of the distributed data processing environment of FIG. 1, on which the interactive ad gesture program is run, in accordance with an embodiment of the present invention.

FIG. 4 depicts a block diagram of components of computing device 400, suitable for smart display system server 110 and/or user wearable devices 130 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Computing device 400 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Programs may be stored in persistent storage 408 and in memory 406 for execution and/or access by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Programs may be downloaded to persistent storage 408 through communications unit 410.

I/O interface(s) 412 allows for input and output of data with other devices that may be connected to smart display system server 110 and/or user wearable devices 130. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    identifying, by one or more processors, a wearable device attempting to pair with a smart display;
    verifying, by the one or more processors, a user wearing the wearable device is an authenticated user;
    detecting, by the one or more processors, a gesture made by the user based on a sensor of the wearable device;
    identifying, by the one or more processors, an action the gesture is mapped to by comparing the gesture with a set of gestures that are overlaying a portion of an interactive advertisement displayed on the smart display at the time the gesture is performed by the user;
    determining, by the one or more processors, whether the user is authorized to complete the action mapped to the gesture detected; and
    responsive to determining that the user is authorized to complete the action mapped to the gesture, completing, by the one or more processors, the action the gesture is mapped to.

2. The computer-implemented method of claim 1, wherein identifying the wearable device attempting to pair with the smart display further comprises:
    identifying, by the one or more processors, the wearable device automatically attempting to pair with the smart display upon the wearable device coming within a pre-set distance of the smart display.

3. The computer-implemented method of claim 1, wherein verifying the user wearing the wearable device is the authenticated user further comprises:
    verifying, by the one or more processors, the user wearing the wearable device is the authenticated user based on biometrics of the user.

4. The computer-implemented method of claim 1, further comprising:
    identifying, by the one or more processors, a time when the gesture is performed by the user.

5. The computer-implemented method of claim 1, wherein the action is selected from the group consisting of purchasing a product, wanting more information about the product, and placing the product in a shopping cart associated with the user.

6. The computer-implemented method of claim 1, wherein determining whether the user is authorized to complete the action mapped to the gesture detected comprises:
    reviewing, by the one or more processors, interactive ad preferences and product purchasing authorizations stored in a user profile associated with the user.

7. A computer program product comprising:
    one or more computer readable storage media and program instructions collectively stored on the one or more computer readable storage media, the stored program instructions comprising:
    program instructions to identify a wearable device attempting to pair with a smart display;
    program instructions to verify a user wearing the wearable device is an authenticated user;
    program instructions to detect a gesture made by the user based on a sensor of the wearable device;
    program instructions to identify an action the gesture is mapped to by comparing the gesture with a set of gestures that are overlaying a portion of an interactive advertisement displayed on the smart display at the time the gesture is performed by the user;
    program instructions to determine whether the user is authorized to complete the action mapped to the gesture detected; and
    responsive to determining that the user is authorized to complete the action mapped to the gesture, program instructions to complete the action the gesture is mapped to.

8. The computer program product of claim 7, wherein the program instructions to identify the wearable device attempting to pair with the smart display further comprise:
    program instructions to identify the wearable device automatically attempting to pair with the smart display upon the wearable device coming within a pre-set distance of the smart display.

9. The computer program product of claim 7, wherein the program instructions to verify the user wearing the wearable device is the authenticated user further comprise:
    program instructions to verify the user wearing the wearable device is the authenticated user based on biometrics of the user.

10. The computer program product of claim 7, further comprising:
    program instructions to identify a time when the gesture is performed by the user.

11. The computer program product of claim 7, wherein the action is selected from the group consisting of purchasing a product, wanting more information about the product, and placing the product in a shopping cart associated with the user.

12. The computer program product of claim 7, wherein the program instructions to determine whether the user is authorized to complete the action mapped to the gesture detected comprise:
    program instructions to review interactive ad preferences and product purchasing authorizations stored in a user profile associated with the user.

13. A computer system comprising:
    one or more computer processors;
    one or more computer readable storage media;
    program instructions collectively stored on the one or more computer readable storage media for execution by at least one of the one or more computer processors, the stored program instructions comprising:
    program instructions to identify a wearable device attempting to pair with a smart display;
    program instructions to verify a user wearing the wearable device is an authenticated user;
    program instructions to detect a gesture made by the user based on a sensor of the wearable device;
    program instructions to identify an action the gesture is mapped to by comparing the gesture with a set of gestures that are overlaying a portion of an interactive advertisement displayed on the smart display at the time the gesture is performed by the user;

program instructions to determine whether the user is authorized to complete the action mapped to the gesture detected; and responsive to determining that the user is authorized to complete the action mapped to the gesture, program instructions to complete the action the gesture is mapped to.

14. The computer system of claim 13, wherein the program instructions to identify the wearable device attempting to pair with the smart display further comprise:

program instructions to identify the wearable device automatically attempting to pair with the smart display upon the wearable device coming within a pre-set distance of the smart display.

15. The computer system of claim 13, further comprising:

program instructions to identify a time when the gesture is performed by the user.

16. The computer system of claim 13, wherein the action is selected from the group consisting of purchasing a product, wanting more information about the product, and placing the product in a shopping cart associated with the user.

17. The computer system of claim 13, wherein the program instructions to determine whether the user is authorized to complete the action mapped to the gesture detected comprise:

program instructions to review interactive ad preferences and product purchasing authorizations stored in a user profile associated with the user.

* * * * *